United States Patent
Minami

[11] Patent Number: 5,944,951
[45] Date of Patent: *Aug. 31, 1999

[54] METHOD FOR REUSING SPENT GAS FROM AN OZONE BLEACHING REACTOR

[75] Inventor: Shusuke Minami, Nashua, N.H.

[73] Assignees: Ingersoll-Rand Company, Woodcliff Lake, N.J.; Beloit Technologies, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/835,787

[22] Filed: Sep. 26, 1997

Related U.S. Application Data

[63] Continuation of application No. 08/456,427, Jun. 1, 1995, abandoned, which is a continuation of application No. 08/038,441, Mar. 29, 1993, abandoned.

[51] Int. Cl.$^6$ ............................. D21C 9/153; D21C 11/06
[52] U.S. Cl. ................................ 162/29; 162/37; 162/38; 162/65
[58] Field of Search .................................. 55/25; 162/15, 162/16, 29, 55, 65, 39, 40, 30.1, 30.11, 56, 37, 38

[56] References Cited

U.S. PATENT DOCUMENTS

| 5,096,469 | 3/1992 | Keefer | 55/25 |
|---|---|---|---|
| 5,296,097 | 3/1994 | Friend | 162/65 |

*Primary Examiner*—Steven Alvo
*Attorney, Agent, or Firm*—Hill & Simpson

[57] ABSTRACT

A method for reusing spent gas from an ozone bleaching reactor includes steps for removing lint from the spent gas, compressing it, passing it through a reactor in which hydrocarbons and carbon monoxide are destroyed by oxidation, and cooling the gas. Injecting the gas together with compressed air into a mist separator for removal of any mist from the gas and then passing the gas through a pressure swing adsorption device in which nitrogen, carbon dioxide, trace water vapor, and other trace elements may be removed by adsorption on a molecular sieve material. The recycled gas is fed to an ozone generator and from there to an ozone/pulp bleaching reactor. By appropriate selection and layering of molecular sieve materials in the pressure swing adsorption device, it is possible to provide selective removal of a variety of gaseous elements from a gas stream.

9 Claims, 2 Drawing Sheets

METHOD FOR REUSING SPENT GAS FROM AN OZONE BLEACHING REACTOR

This application is a continuation of application Ser. No. 08/456,427 filed on Jun. 1, 1995, and now abandoned; which is a continuation of Ser. No. 08/038,441, filed Mar. 29, 1993, and now abandoned.

BACKGROUND OF THE INVENTION

This invention relates generally to pulp bleaching and more particularly to a method for economically operating an ozone generator in connection with such pulp bleaching.

In the ozone bleaching process, ozone gas is generated on site either from air or from oxygen gas. Typically between about one percent and seven percent by weight ozone is discharged from an ozone generator in a carrier gas of oxygen or air, depending upon the feed gas of the ozone generator. This mixture is fed to an ozone reactor in which it is brought into contact with wood pulp for bleaching the pulp. In view of the reaction kinetics between ozone and pulp, a high concentration of ozone in the carrier gas is desired in order to maintain a high reaction rate and to minimize the contact time required between the pulp and the ozone gas. Since ozone concentration from an ozone generator is directly controlled by oxygen concentration in the feed gas, it is clear that oxygen rich feed gas is desirable for the ozone generator. Such oxygen rich feed gas can be provided as essentially pure oxygen from distillation of air, or as oxygen enriched air resulting from adsorption of nitrogen from air which is passed through a pressure swing adsorption unit. In any case, even when relatively pure oxygen is used as the feed gas for the ozone generator, usually only about four to seven percent ozone results. Therefore, a large fraction of the gas in an ozone/pulp contacting reactor consists of relatively pure oxygen carrier gas. After reaction with the pulp, this gas is discharged from the reactor as spent gas together with byproduct gases such as carbon monoxide, carbon dioxide, various hydrocarbon molecules, water vapor, and a minimal amount of residual ozone. The spent gas is usually passed through a hydrocarbon destructor and a gas dryer in order to return relatively pure gas to the ozone generator as feed gas. This process, however, permits a gradual build-up of carbon dioxide in the system due to generation of carbon dioxide as a byproduct of the pulp/ozone reaction and as a result of catalytic oxidation of carbon monoxide and hydrocarbons in the hydrocarbon destructor.

Although carbon dioxide is not harmful to the ozone/pulp reaction, the accumulation of carbon dioxide in the recycled oxygen gas stream reduces the concentration of oxygen in the feed gas and, consequently, ozone concentration in the reagent gas being fed to the bleaching reactor. With each, cycle through the system, the percentage of carbon dioxide increases, thereby increasing specific power consumption and further retarding the reaction. In order to alleviate this problem, a part of the spent gas is purged from the gas loop so that, when replaced with pure oxygen or enriched air, the carbon dioxide content of the carrier gas can be maintained at an acceptable level. This level is usually determined based on the price of oxygen, electrical power cost, and required concentration of ozone. Purging of 10–20% of the gas volume is normally necessary to maintain the concentration of oxygen within the acceptable range. For example, equilibrium oxygen concentration in the recycled spent gas is around 80–85%, when about 10% of the spent gas is purged, and cryogenically produced oxygen at virtually 100% purity is used as makeup oxygen.

When using oxygen enriched air produced by a pressure swing adsorption generator, about 90–95% of the feed gas to the ozone generator is oxygen. The balance of the feed gas is nitrogen which has not been adsorbed and argon or other gases which are not adsorbable in the zeolite bed of the reactor. Thus, in addition to the carbon dioxide, argon and other essentially inert gases (with respect to pulp) also accumulate in the gas loop. This necessitates increased purging of gas from the system and a resulting increased demand for makeup gas. In any case, control is required in order to provide the proper level of purging and makeup gas additions. In some cases, a single pass system is used, in which spent gas from the ozone pulp reactor is discarded or is reused for purposes unrelated to ozone generation. In any case, an economic cost is imposed on the operation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for reusing spent gas from an ozone bleaching reactor in a pulp bleaching system having a pressure swing adsorption device for supplying oxygen to an ozone generator including the steps of directing spent gas from a lint remover, which receives gas from the ozone bleaching reactor, after the gas is separated from the pulp, to a gas compressor, and compressing the spent gas; passing the compressed spent gas through a hydrocarbon destructor and cooler to oxidize any carbon monoxide and hydrocarbons and to cool the spent gas; passing the spent gas, together with injected compressed air, through a separator to remove mist; and passing the gas from the separator through the pressure swing adsorption (PSA) device to separate nitrogen, carbon dioxide, and trace water vapor to produce air with an oxygen concentration greater than about 90% for ozone generator feed gas.

The foregoing and other aspects will become apparent from the following detailed description of the invention when considered in conjunction with the accompanying drawing figures.

DETAILED DESCRIPTION

Figure 1:
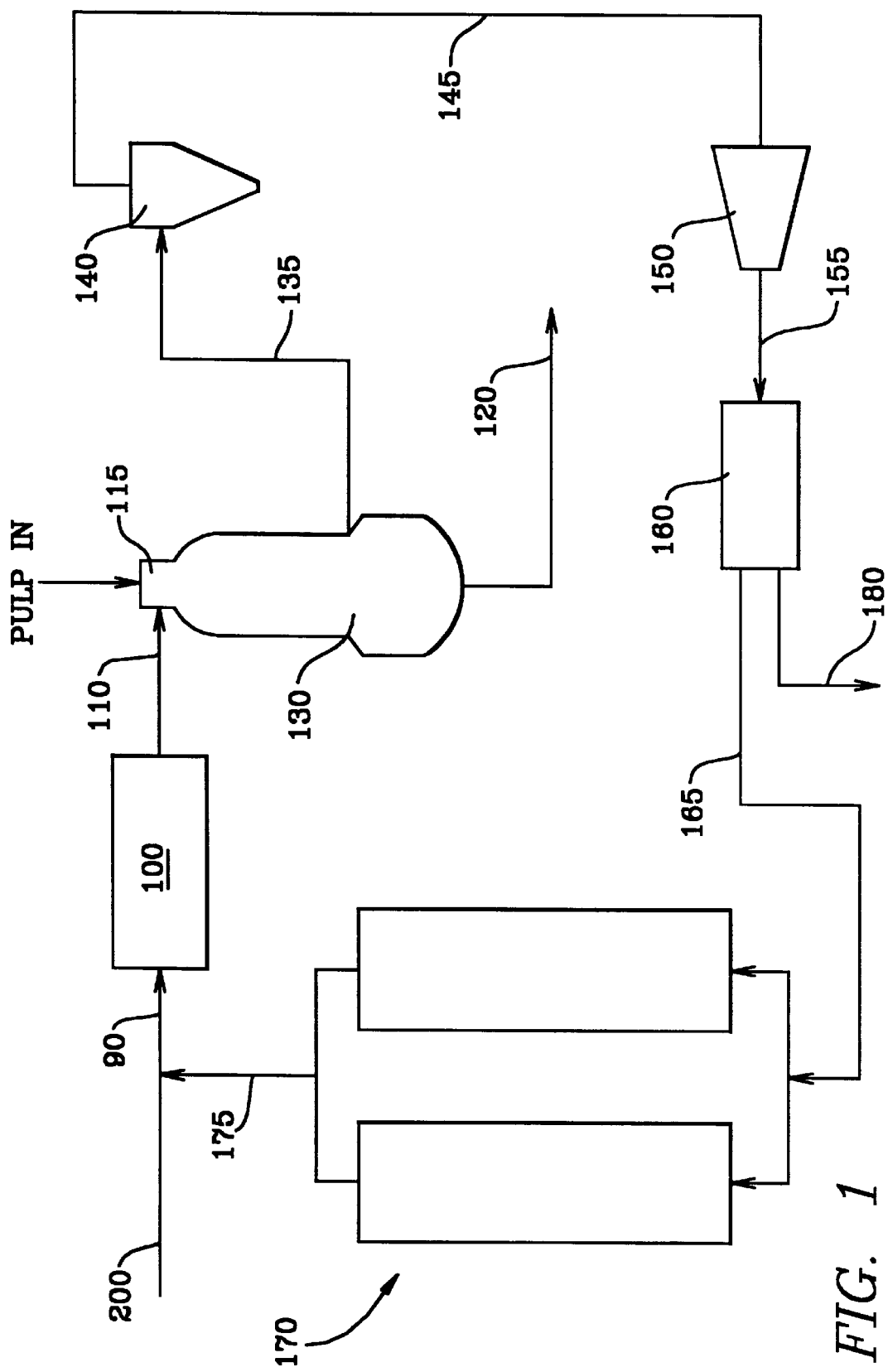
FIG. 1 is a schematic flow chart representation of a spent gas recycling system according to the prior art.

A conventional spent gas recycling system is charted in FIG. 1. Starting with ozone reactor 130, in which ozone and pulp are reacted, the pulp is discharged from the reactor through discharge line 120. The reaction gas including ozone, carrier gas, hydrocarbon gases, carbon dioxide, carbon monoxide, and mists and vapors is discharged from reactor 130 through gas discharge line 135 into lint remover 140. From lint remover 140, the gas travels through line 145 to gas compressor 150 in which it is compressed for discharge to hydrocarbon destructor and cooler 160, through compressed gas discharge line 155. From the destructor, a portion of the gases purge through outlet 180 to compensate for the buildup of carbon dioxide in the system, while the balance passes through line 165 to mist separator and dryer 170 in which moisture, water vapor, and other mists are removed. Makeup oxygen from line 200 is mixed with the recycled gas from separator and dryer 170 in ozone generator feed line 90. It passes through ozone generator 100 and from there through reactor feed line 110 into inlet 115 in which it is mixed with incoming wood pulp.

Generally, for this type of system, oxygen from a liquid source is used for makeup oxygen to the feed gas of the ozone generator. As long as pure oxygen is fed to the ozone generator, and an appropriate volume of purged gas is eliminated, a reasonably steady carbon dioxide level can be maintained. Nevertheless, a small but measurable quantity of pure oxygen is lost in the purged gas. Since pure oxygen is relatively expensive, this adds an economic cost burden to the process.

Figure 2:
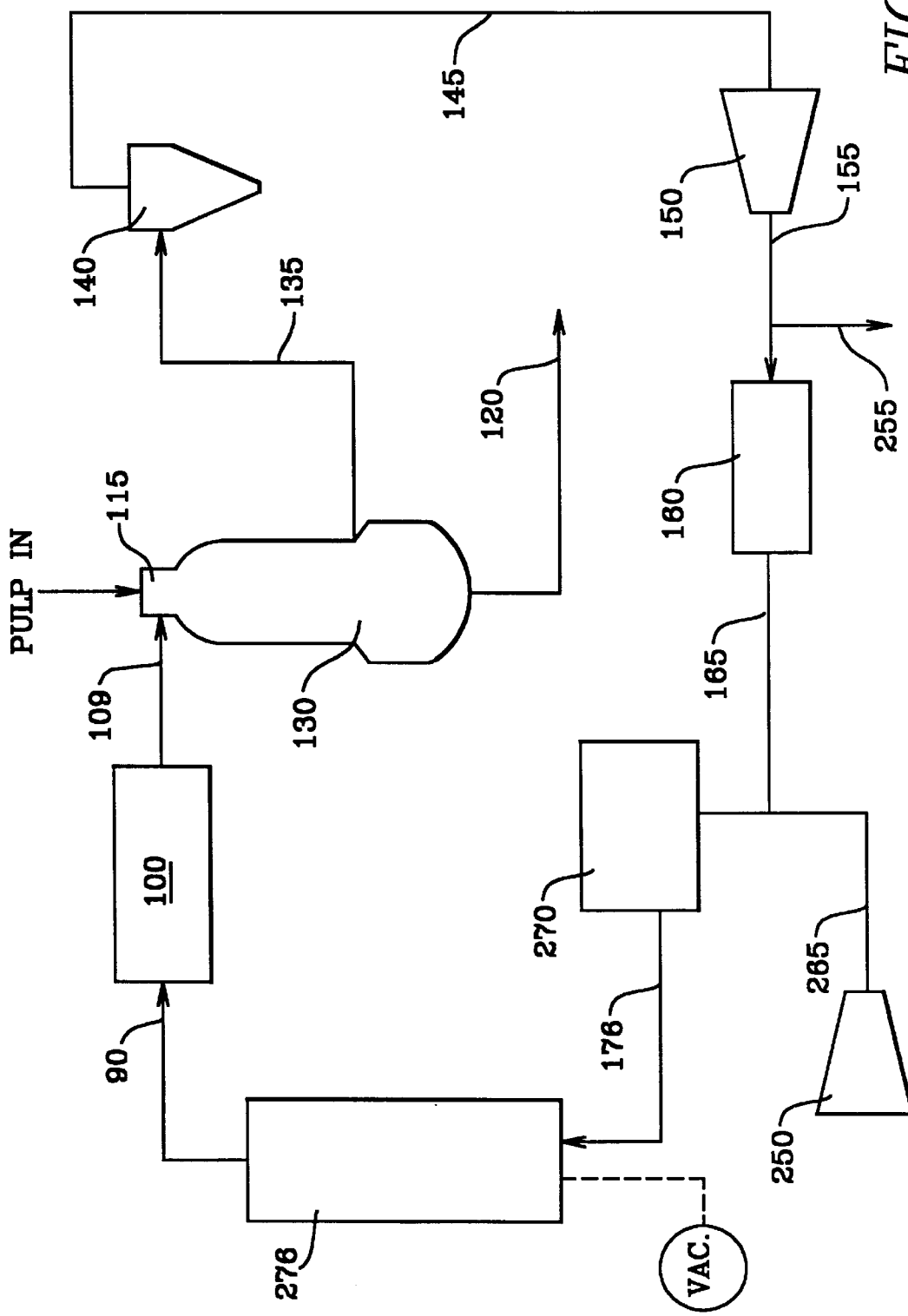
FIG. 2 is a schematic flow chart illustrating the spent gas recycling embodiment of the present invention.

Referring now to FIG. 2, an embodiment of the present invention is seen. Ozone reactor 130 discharges pulp through pulp discharge line 120 and spent bleaching gas through gas discharge line 135. After passing through lint remover 140, the spent gas is fed to gas compressor 150 through line 145. From compressor 150, compressed spent gas is fed to hydrocarbon destructor and cooler 160 through feed line 155. A portion of the compressed gas from line 155 is purged through purge line 255 to be used at another process such as; oxygen delignification, for example. The spent gas from hydrocarbon destructor 160 in line 165, and compressed air from air compressor 250, in line 265, mixed together to enter mist separator 270 in which mist is removed from the gas. The gas, now substantially free of mist, and augmented by the compressed air, enters PSA system 276 in which, after adsorption of gas components on the zeolite of the system, enriched substantially dry gas of approximately 90 to 95% oxygen is discharged through line 90 as feed gas for the ozone generator 100. Wood pulp is mixed with the ozone in its enriched air carrier gas from line 109, in inlet 115 of ozone reactor 130.

Spent gas recycling through a pressure swing adsorption system, as described in FIG. 2, is also effective in removing undesirable carbon dioxide and moisture from the spent gas. Some gas purging will, however, still be required because of the gradual accumulation of argon in the system. Since argon is not adsorbed by zeolite, and since it does not participate in the bleaching reactions, the gas experiences a small increase in argon content with each cycle through the reactor system. A purge of approximately 10%, by volume, of spent gas for a 6% ozone concentration, yields optimum economic performance for the system. The impact of gas purging on the operating cost is relatively small since purged gas is replaced with air instead of pure oxygen.

Another advantage of the method of the present invention is that it is possible to eliminate the hydrocarbon destructor system if the adsorbent of the pressure swing adsorption system can effectively trap hydrocarbons and other gaseous reaction products generated in the ozone reactor. Freedom from carbon dioxide accumulation in the system resulting from adsorption in the molecular sieve (zeolite) of the system, results in a high oxygen concentration in the spent gas. This permits effective usage of the spent gas for oxygen delignification, and it also results in a lower specific power consumption for the ozone generator when the oxygen rich spent gas is returned to the generator.

The action of the pressure swing adsorption unit depends upon the ability of zeolite or other molecular sieve material to selectively capture molecules from gases which pass through the system. As in any such system, it is necessary, periodically, to regenerate the molecular sieve by exposing it to an elevated temperature, a vacuum, or a combination of elevated temperature and vacuum.

The pressure swing adsorption process may be successfully applied when the required concentration of oxygen is not excessively high. Thus, for ozone generation, the process is adequate; since, even though the argon contained in air is concentrated along with the oxygen of the air, other contaminants such as water vapor and carbon dioxide can be removed from the air together with nitrogen. Even though argon accumulates in the system when the spent gas is recycled back to the pressure swing adsorption unit in the present invention, a part of the spent gas will be purged in order to maintain the ozone generator feed gas within the acceptable range. However, since carbon dioxide is no longer accumulating in the recycling system, the amount of gas purging required will be smaller. In the present invention, it is also proposed as a further economy, that the purged spent gas be used for an oxygen delignification stage, if such is incorporated within the mill, or for combustion enhancement in a boiler.

About 15% purging from the spent gas will meet the oxygen requirement for the oxygen delignification step if the oxygen application is 2% on pulp and the ozone application is 1% on pulp at 6% ozone concentration. A purge of this magnitude will maintain the increase in argon concentration in the recycled gas system to an almost insignificant level. For example, the equilibrium argon concentration in the ozone generator feed gas expected in the above example is less than about 10%. In other words, the oxygen concentration in the recycled gas system is maintained above 90% which is comparable to the oxygen concentration obtained by using only virgin air as pressure swing adsorption feed gas. In contrast, the expected oxygen concentration in the ozone generator feed gas in the conventional spent gas recycling method of the prior art is no more than 80–85% at an economically feasible purge rate.

The foregoing are a few of the advantages inherent in the present invention. Various other advantages will become apparent upon due reflection.

What is claimed is:

1. Method for reusing spent gas from an ozone bleaching reactor in a pulp bleaching system having an in-line pressure swing adsorption device for supplying oxygen to an ozone generator for generating ozone for use in a bleaching reactor, comprising the following sequential steps:

directing spent gas from a lint remover, which receives gas from the ozone bleaching reactor after said gas is separated from the pulp, to a gas compressor;

compressing the spent gas;

purging a quantity of about 10% of the compressed spent gas;

passing the remaining compressed spent gas through a hydrocarbon destructor and cooler to oxidize any carbon monoxide and hydrocarbons and to cool the spent gas;

providing a make up supply of compressed air to the cooled spent gas;

passing the spent gas, together with the supplied compressed air, through a separator to remove mist; and passing the spent gas and compressed air from the separator through the in-line pressure swing adsorption device to separate nitrogen, carbon dioxide, and trace water vapor to produce gas with an oxygen concentration greater than about 90% for ozone generator feed gas without the addition of supplemental oxygen-enriched gas, the in-line pressure swing adsorption device being connected in-line between the separator and the ozone generator.

2. Method according to claim 1, comprising the further steps of:
   extracting a quantity of compressed spent gas from said pulp bleaching system before said compressed spent gas is passed through said hydrocarbon destructor; and
   directing said extracted quantity of compressed spent gas to another pulp treatment step.

3. Method according to claim 2, wherein the other pulp treatment step is an oxygen delignification step.

4. Method according to claim 3, wherein the quantity of extracted compressed spent gas is about 15%.

5. Method according to claim 1, wherein an equilbrium argon concentration in the ozone generator feed gas is less than about 10%.

6. A method for reusing spent gas from an ozone bleaching reactor in pulp bleaching system having an in-line pressure swing adsorption device for supplying oxygen to an ozone generator for generating ozone for use in the bleaching reactor, comprising the following sequential steps:
   directing spent gas from a lint remover, which receives gas from the ozone bleaching reactor after said gas is separated from the pulp, to a gas compressor;
   compressing the spent gas;
   purging a quantity of about 10% of the compressed spent gas;
   extracting a quantity of compressed spent gas to maintain an argon concentration entering the ozone bleaching reactor less than about 10%;
   passing the remaining compressed spent gas through a hydrocarbon destructor and cooler to oxidize any carbon monoxide and hydrocarbons and to cool the spent gas;
   providing a quantity of compressed air, the quantity of compressed air being equal to the quantity of oxygen contained in the extracted spent gas plus the oxygen consumed in the pulp bleaching system;
   passing the spent gas and the compressed air through a separator to remove mist; and
   passing the gas from the separator through the in-line pressure swing adsorption device to separate nitrogen, carbon dioxide, and trace water vapor to produce gas with an oxygen concentration greater than about 90% for ozone generator feed gas without the additional of supplemental oxygen-enriched gas, the in-line pressure swing adsorption device being connected in-line between the separator and the ozone generator.

7. The method according to claim 6, comprising the further step of:
   directing said extracted quantity of compressed spent gas to another pulp treatment step.

8. The method according to claim 7, wherein the other pulp treatment step is an oxygen delignification step.

9. A method for reusing spent gas from an ozone bleaching reactor in a pulp bleaching system having an ozone generator for generating ozone for use in the bleaching reactor, the method comprising the following sequential steps:
   directing spent gas from a lint remover, which receives gas from the ozone bleaching reactor after said gas is separated from the pulp, to a gas compressor;
   compressing the spent gas;
   extracting a quantity of the compressed spent gas to maintain an argon concentration entering the ozone bleaching reactor less than about 10%, wherein the quantity of the spent gas extracted is about 15%; and
   producing an ozone generator feed gas having an oxygen concentration greater than about 90% without mixing the remaining spent gas with a separately supplied and oxygen-enriched, make-up gas; wherein the step of producing comprises the steps of: replacing the quantity of extracted spent gas with a supply of compressed air having a quantity of oxygen equal to the quantity of oxygen contained in the extracted spent gas plus the oxygen consumed in the pulp bleaching system; passing the remaining spent gas and the supplied compressed air through a separator to remove mist, the spent gas including by-product gases from the ozone bleaching reactor, the by-product gases including carbon monoxide and hydrocarbon gases; disposing a pressure swing adsorption device flow-wise in-line between the separator and the ozone generator; passing the remaining spent gas and the supplied compressed air through the pressure swing adsorption device to separate nitrogen, carbon dioxide, carbon monoxide, hydrocarbon gases, and trace water vapor to produce the ozone generator feed gas; and discharging the ozone generator feed gas from the pressure swing adsorption device to the ozone generator.

* * * * *